(12) United States Patent
Yang et al.

(10) Patent No.: US 12,037,523 B2
(45) Date of Patent: Jul. 16, 2024

(54) YELLOWING RESISTANT PSA

(71) Applicant: Avery Dennison Corporation, Mentor, OH (US)

(72) Inventors: Yurun Yang, Shanghai (CN); Biao Shen, Shanghai (CN)

(73) Assignee: Avery Dennison Corporation, Mentor, OH (US)

(*) Notice: Subject to any disclaimer, the term of this patent is extended or adjusted under 35 U.S.C. 154(b) by 503 days.

(21) Appl. No.: 17/292,034

(22) PCT Filed: Nov. 8, 2018

(86) PCT No.: PCT/CN2018/114589
§ 371 (c)(1),
(2) Date: May 7, 2021

(87) PCT Pub. No.: WO2020/093313
PCT Pub. Date: May 14, 2020

(65) Prior Publication Data
US 2021/0395578 A1 Dec. 23, 2021

(51) Int. Cl.
C09J 7/29 (2018.01)
C09J 5/00 (2006.01)
C09J 7/22 (2018.01)
C09J 7/38 (2018.01)
C09J 11/06 (2006.01)

(52) U.S. Cl.
CPC .......... *C09J 7/385* (2018.01); *C09J 5/00* (2013.01); *C09J 7/22* (2018.01); *C09J 7/29* (2018.01); *C09J 11/06* (2013.01); *C09J 2203/334* (2013.01); *C09J 2301/302* (2020.08); *C09J 2301/408* (2020.08); *C09J 2400/166* (2013.01); *C09J 2433/00* (2013.01)

(58) Field of Classification Search
CPC .............. C08F 220/14; C08F 220/1804; C08F 220/1808; C08F 220/20; C08K 5/0041; C08K 5/353; C08K 5/00; C09J 11/06; C09J 133/04; C09J 133/066; C09J 2203/334; C09J 2301/302; C09J 2301/408; C09J 2400/166; C09J 2433/00; C09J 5/00; C09J 7/22; C09J 7/29; C09J 7/385
See application file for complete search history.

(56) References Cited

U.S. PATENT DOCUMENTS

| 5,391,414 | A | 2/1995 | Doering et al. |
| 6,153,288 | A | 11/2000 | Shih et al. |
| 6,225,384 | B1 | 5/2001 | Renz et al. |
| 6,268,415 | B1 | 7/2001 | Renz et al. |
| 6,342,122 | B1 | 1/2002 | Riley et al. |
| 6,586,510 | B1 | 7/2003 | Brown et al. |
| 6,642,330 | B2 | 11/2003 | McGinniss et al. |
| 7,160,960 | B2 | 1/2007 | Ilda et al. |
| 7,309,524 | B2 | 12/2007 | Krawinkel |
| 7,309,737 | B2 | 12/2007 | Kim et al. |
| 7,439,303 | B2 | 10/2008 | Ikeda et al. |
| 7,465,493 | B2 | 12/2008 | Lu |
| 7,691,925 | B2 | 4/2010 | Amano et al. |
| 7,829,606 | B2 | 11/2010 | Lu et al. |
| 8,398,889 | B2 | 3/2013 | Kupsky et al. |
| 8,399,090 | B2 | 3/2013 | Yano et al. |
| 8,426,514 | B2 | 4/2013 | Yuan et al. |
| 8,685,204 | B2 | 4/2014 | Nakano et al. |
| 8,932,710 | B2 | 1/2015 | Inoue et al. |
| 9,080,083 | B2 | 7/2015 | Schumann et al. |
| 9,410,028 | B2 | 8/2016 | Prenzel et al. |
| 9,475,967 | B2 | 10/2016 | Lipscomb et al. |
| 9,499,726 | B2 | 11/2016 | Zmarsly et al. |
| 2005/0064181 | A1 | 3/2005 | Blank et al. |
| 2006/0234040 | A1 | 10/2006 | Liu et al. |
| 2007/0286959 | A1 | 12/2007 | Palmer |
| 2009/0068459 | A1 | 3/2009 | Kishioka et al. |
| 2009/0298995 | A1 | 12/2009 | Krawinkel |
| 2014/0113070 | A1 | 4/2014 | Schumann et al. |
| 2015/0041042 | A1 | 2/2015 | Zhang et al. |
| 2017/0114543 | A1 | 4/2017 | Tang et al. |
| 2017/0306188 | A1 | 10/2017 | Fujimoto et al. |
| 2018/0022972 | A1 | 1/2018 | Zhu et al. |
| 2018/0086946 | A1 | 3/2018 | Hirao et al. |
| 2020/0024489 | A1 | 1/2020 | Zhou et al. |

FOREIGN PATENT DOCUMENTS

| CN | 1182218 | 12/2004 |
| CN | 101781535 | 12/2011 |
| CN | 101698784 | 1/2012 |
| CN | 101275059 | 5/2012 |
| CN | 101798491 | 5/2012 |
| CN | 102516892 | 6/2012 |

(Continued)

OTHER PUBLICATIONS

International Search Report and Written Opinion dated Jul. 31, 2019 issued in corresponding IA No. PCT/CN2018/114589 filed Nov. 8, 2018.

(Continued)

*Primary Examiner* — Lawrence D Ferguson

(57) ABSTRACT

Provided herein is a pressure sensitive adhesive (PSA) comprising a polycrylate base polymer, a crosslinker and a fluorescer. The crosslinker does not comprise a metal acetylacetonate, a metal alkoxide, or an alkoxy-metal acetylacetonate, and the fluorescer comprises less than 0.1 wt. % metal oxide based on the solid weight of the adhesive. The adhesive is resistant to yellowing under adverse conditions such as high temperature treatment and/or exposure to UV.

21 Claims, No Drawings

(56) References Cited

FOREIGN PATENT DOCUMENTS

| | | |
|---|---|---|
| CN | 101864257 | 7/2012 |
| CN | 102206475 | 11/2012 |
| CN | 102260472 | 1/2013 |
| CN | 102260473 | 1/2013 |
| CN | 102504732 | 9/2013 |
| CN | 102850972 | 1/2014 |
| CN | 102634301 | 5/2014 |
| CN | 103937429 | 7/2014 |
| CN | 103205226 | 12/2014 |
| CN | 103396741 | 1/2015 |
| CN | 102746445 | 2/2015 |
| CN | 103468179 | 5/2015 |
| CN | 103756603 | 9/2015 |
| CN | 103911099 | 9/2015 |
| CN | 103694921 | 12/2015 |
| CN | 105602492 | 5/2016 |
| CN | 105647442 | 6/2016 |
| CN | 104312500 | 8/2016 |
| CN | 105860885 | 8/2016 |
| CN | 105907340 | 8/2016 |
| CN | 104449486 | 9/2016 |
| CN | 106008792 | 10/2016 |
| CN | 106147660 | 11/2016 |
| CN | 106189901 | 12/2016 |
| CN | 106189904 | 12/2016 |
| CN | 106520033 | 3/2017 |
| CN | 106566428 | 4/2017 |
| CN | 106589221 | 4/2017 |
| CN | 106632818 | 5/2017 |
| CN | 106768600 | 5/2017 |
| CN | 104673143 | 6/2017 |
| CN | 106832101 | 6/2017 |
| CN | 106893510 | 6/2017 |
| CN | 106597596 | 8/2017 |
| CN | 106995511 | 8/2017 |
| CN | 107057601 | 8/2017 |
| CN | 105219316 | 9/2017 |
| CN | 107129777 | 9/2017 |
| CN | 107629738 | 1/2018 |
| CN | 107674606 | 2/2018 |
| CN | 107903854 | 4/2018 |
| CN | 108003818 | 5/2018 |
| CN | 104845565 | 6/2018 |
| CN | 106675462 | 6/2018 |
| CN | 105950081 | 8/2018 |
| CN | 106590478 | 8/2018 |
| CN | 106520032 | 2/2019 |
| CN | 107201199 | 10/2019 |
| CN | 107746445 | 12/2019 |
| CN | 106987015 | 5/2020 |
| CN | 106749874 | 8/2020 |
| EP | 0371635 | 7/1996 |
| EP | 1465778 | 4/2007 |
| EP | 1699893 | 5/2007 |
| EP | 2334516 | 11/2012 |
| EP | 2147960 | 6/2013 |
| EP | 2298846 | 4/2017 |
| EP | 2888329 | 4/2018 |
| JP | 2001-098250 | 4/2001 |
| JP | 2008-297478 | 12/2008 |
| JP | 2013-166915 | 8/2013 |
| WO | 96/40087 | 12/1996 |
| WO | 2017/117090 | 7/2017 |
| WO | 2018/031554 | 2/2018 |
| WO | 2018/072161 | 4/2018 |

OTHER PUBLICATIONS

International Preliminary Report on Patentability dated May 20, 2021 issued in corresponding IA No. PCT/CN2018/114589 filed Nov. 8, 2018.

YELLOWING RESISTANT PSA

CROSS-REFERENCE TO RELATED APPLICATION

The present application is a 371 of International Patent Application No. PCT/CN2018/114589, which was published in English on May 14, 2020, and is incorporated herein by reference in its entirety.

FIELD

The present disclosure relates generally to pressure-sensitive adhesives (PSAs), in particular, to PSAs with improved yellowing resistance when exposed to heat and/or UV light/radiation. This application also relates to labels containing the improved PSAs as well as to methods of producing the PSAs and the labels.

BACKGROUND

PSAs are compositions known to provide adhesiveness or tack to various substrates when applied at room temperature. This adhesiveness can provide for instantaneous adhesion to the substrate when subjected to pressure. PSAs are generally easy to handle in solid form and have a long shelf-life, so they are widely used for the manufacture of, for example, self-adhesive labels.

PSAs, due to their excellent mechanical features, are useful for automotive and machinery applications. However, these automobiles and machines are often operated under high temperature and can be exposed to adverse weather conditions, such as (solar) UV radiation. Conventional PSAs, detrimentally, often change color under these conditions, e.g., show a yellow color. This is undesirable particularly in applications where visibility and transparency are required, for example, a window of the automobile.

One solution to improve yellowing resistance is by using special polyacrylate base polymer, but this approach is expensive and the result is often not satisfactory to maintain the non-yellow appearance.

Even in view of the solutions known in the art, the need exists for improved PSA that exhibit superior yellowing resistance.

SUMMARY OF THE INVENTION

In some embodiments, this disclosure provides a pressure sensitive adhesive comprising: a polyacrylate base polymer, a crosslinker, wherein the crosslinker does not comprise a metal acetylacetonate, a metal alkoxide, or an alkoxy-metal acetylacetonate, a fluorescer, wherein the fluorescer comprises less than 0.1 wt. % metal oxide based on the solid weight of the adhesive.

In some embodiments, the pressure sensitive adhesive demonstrates a peel strength of at least 1 N/inch to 20 N/inch, as measured by FINAT Test Method 1 (2018). In some embodiments, the pressure sensitive adhesive demonstrates a yellowing resistance $\Delta b$ value less than 1.3 and/or a yellowing resistance $\Delta e$ less than 2.1, as measured by ASTM D2244, or when exposed to a temperature of 90° C. for 2 weeks or when exposed to ultraviolet light for at least one week.

In some embodiments, the fluorescer is present in an amount ranging from 0.01 to 0.4 wt. %, e.g., 0.02-0.3 wt. %, based on the solid weight of the pressure sensitive adhesive. In some embodiments, the crosslinker is present in an amount ranging from 0.05-0.4 wt. %, based on the solid weight of the PSA. The crosslinker may comprise an isocyanate, an epoxy, or a combination thereof. In some embodiments, the crosslinker is tetra-glycidyl m-xylene diamine. In some embodiments, the fluorescer is a compound having at least one vinyl group. In some embodiments, the fluorescer can be a benzoxazole derivative (OB-1 or 135 (DT)) or a biphenyl derivative or a combination thereof.

In some embodiments, the pressure sensitive adhesive is disposed in the form of a flat layer and wherein the flat layer has a thickness in the range of 8-80 μm.

In some embodiments, the fluorescer comprises a benzoxazole derivative comprising a vinyl group, the crosslinker comprises epoxy resin, isocyanine, or combination thereof, and the polyacrylate base polymer is produced by polymerizing one or more monomers selected from the group consisting of butyl acrylate, 2-ethylhexyl acrylate, methyl acrylate and acrylic, and 2-hydroxyethyl acrylate, and the pressure sensitive adhesive demonstrates a yellowing resistance $\Delta b$ value less than 1.3 and/or a yellowing resistance $\Delta e$ less than 2.1 as measured by ASTM D2244 (2018), and a peel strength ranging from 1 N/inch to 20 N/inch, as measured by FINAT Test Method 1 (2018).

In some embodiments, this disclosure provides a label comprising a pressure sensitive adhesive disclosed herein.

In some embodiments, the pressure sensitive adhesive is essentially free of chlorinated polyolefin comprising the pressure sensitive adhesive as disclosed herein.

In some embodiments, this disclosure provides a method for increasing yellowing resistance to a pressure sensitive adhesive comprising adding a fluorescer to a composition comprising a polyacrylate base polymer, and a crosslinker, wherein the fluorescer comprises less than 0.1 wt. % metal oxide, and wherein the crosslinker does not comprise a metal acetylacetonate, a metal alkoxide, or an alkoxy-metal acetylacetonate.

In some embodiments, the disclosure provides a pressure sensitive adhesive solution comprising a polyacrylate base polymer solution, a crosslinker, wherein the crosslinker does not comprise a metal acetylacetonate, a metal alkoxide, or an alkoxy-metal acetylacetonate, a fluorescer, wherein the fluorescer comprises less than 0.1 wt. % metal oxide, and a solvent.

DETAILED DESCRIPTION OF THE INVENTION

The present invention relates generally to pressure sensitive adhesives (PSAs) that provide improved yellowing resistance when exposed to heat and/or UV, while maintaining the mechanical performance of the PSA.

Unless otherwise expressly stated, all concentration percentages in this disclosure refer to weight to weight percentages.

As noted herein, a variety of conventional PSAs are known in the art. Many of these adhesives, however, do not demonstrate desired/suitable yellowing resistance.

JP2001098250 discloses a PSA comprising a fluorescer to confer yellowing resistance under broad weathering conditions, however, the fluorescer is a metal oxide and it does not demonstrate desired/suitable yellowing resistance under high temperatures.

US20140113070 discloses a primer comprising an acrylate polymer, a crosslinker, and a fluorescer. All the crosslinkers used in the primer contain metal. The primer is used to coat the substrate before application of an adhesive tape to the primer-coated substrate. A fluorescer is used in the primer to distinguish objects that have been primed to receive the adhesive tape from those that have not been primed. The adhesive tape itself does not contain fluorescers and has not been shown to possess desired/suitable yellowing resistance. US20150041042A1 discloses using a luminescent agent, which is not a fluorescer. US20060234040 discloses broadly the use of a fluorescer, but is silent as to what specific type of fluorescers are useful, especially in applications that require superior yellowing resistance.

The disclosed PSAs, by including a non-metal oxide as a fluorescer (in disclosed amounts) in combination with the polyacrylate base polymer and optionally, the crosslinkers, surprisingly demonstrate balanced properties of yellowing resistance and good mechanical performance, which were previously unattainable. Furthermore, the disclosure provides a convenient method of increasing yellowing resistance by adding the disclosed fluorescers, which can be used regardless of the physical properties of the base polymer.

Importantly, the inventors have found that the disclosed PSAs are capable of maintaining low Δb values that, surprisingly, are well within tolerance thresholds, under heating conditions, UV conditions, and/or other weather conditions. In some embodiments, the Δb of the PSA is less than 1.3, for example, less than 1.2, less than 1.0, less than 0.8, less than 0.5, or less than 0.3 when the PSA has been kept in oven at 90° C. for 2-3 weeks or when exposed to ultraviolet light for at least one week. In some embodiments, the Δe of the PSA is less than 1.5, for example, less than 1.4, less than 1.2, less than 1.0, less than 0.8, less than 0.5, or less than 0.3 when the PSA has been kept in oven at 90° C. for 2-3 weeks or when exposed to UVB at an intensity of 0.4-1 W/m$^2$/nm for at least one week.

For purpose of this disclosure, resistance to yellowing when the PSA is under high temperature, e.g., above 40° C., above 50° C., above 60° C., above 70° C., above 80° C., or about 90° C., is referred to as thermal yellowing resistance; and resistance to yellowing when exposed to UV is referred to as UV yellowing resistance. The PSAs disclosed herein display excellent thermal yellowing resistance, UV yellowing resistance, or both.

The UV yellowing resistance can be tested in a number of ways, which are well known in the art. In one exemplary method, test samples are irradiated with Ultra Violet light for a testing period, and the color changes are detected (as discussed below) before, during, and after irradiation. In some cases, the UV light is an Ultraviolet B light (UVB). In some cases, the UVB light is 313 nm Ultraviolet B light, i.e., having a wavelength of 313 nm. The intensity of the UVB can be in the range of 0.4-1 W/m$^2$/nm, e.g., 0.5-0.8, or about 0.63 W/m$^2$/nm. The testing period may last 50-200 hours, e.g., 50-150 hours, 75-120 hours, or about 100 hours. In some cases, the testing period comprises or consists of multiple cycles of a UVB irradiation that is followed by condensation at 40-60° C., e.g., 50° C., within each cycle the UVB irradiation usually last about 3-5 hours, e.g., about 4 hours. In some cases, the UVB irradiation is performed at a temperature ranging from 50-70° C., for example, about 60° C. One of the standard tests that is well known and can be used is Accelerated Exposure of Automotive Exterior Materials Using a Fluorescent UV and Condensation Apparatus (SAE J2020). Equipment that can be used for UV yellowing resistance test are also readily available commercially; for example, QUV® spray tester and UVB 313-EL lamps are available from Q-LAB, Westlake, Ohio. In one particular embodiment, test samples are placed in the QUV spray tester for a test period of 100 hours according to the SAE J2020 test conditions. Each cycle of the test period includes a 4-hour UVB irradiation, at an intensity of 0.63 W/m2/nm using UVB 313-EL lamps at 60° C., and a subsequent 4-hour condensation at 50° C. Test samples are monitored periodically for changes in appearance.

Thermal yellowing resistance can be measured by placing the test samples under heat in a temperature controlled oven and measuring the color change before, during, and after the temperature treatment. The oven is typically kept at a temperature that is well above ambient temperature, for example, in a range of 40° C.-120° C., e.g., 60° C.-120° C., 70° C.-110° C., 80° C.-100° C., or about 90° C. In terms of lower limits, the temperature is above 40° C., e.g., above 50° C., above 60° C., above 70° C., or above 80° C. In terms of upper limits, the temperature is lower than 120° C., e.g., lower than 110° C., or lower than 100° C. The testing period of heat treatment may vary in length. In some cases, the testing period is 1-5 weeks (7-35 days), for example, 10-30 days, 15-20 days, or about 2 weeks.

PSAs tend to change color from being transparent to yellow, particularly with passage of time under heating, being exposed to UV, and/or other weathering conditions. Yellowing of PSA can be measured using color metrics well known to persons of ordinary skill in the art. One exemplary color metrics is the L a b Color system, e.g., the one released in 1966 by Hunter Associates Laboratory, Inc. (Reston, VA), in which L indicates lightness, a is the red/green coordinate, and b is the yellow/blue coordinate. Deltas (Δs) for these three coordinates (ΔL, Δa, and Δb) indicate how different are the L, a, and b values of the sample before and after treatment, e.g., treating with high temperature or UV. Δe represents total color difference and takes into account the differences between the L, a, and b of the sample. By measuring the Δs for these coordinates as indicated below, it can be determined whether a PSA possess yellowing resistance under the treatment conditions. Exemplary formulae include:

ΔL (L sample minus L standard)=difference in lightness and darkness (+=lighter, −=darker)

Δa (a of after-treatment sample minus a pretreatment sample)=difference in red and green (+=redder, −=greener)

Δb (b sample minus b standard)=difference in yellow and blue (+=yellower, −=bluer)

Δe=[ΔL*2+Δa*2+Δb*2]½

Tolerance thresholds may be set for the Δ values. Δ values that are greater than these thresholds indicate that there is too much difference between the pre-treatment sample and the after-treatment sample. A positive value of Δb is indicates that the sample becomes more yellow after the treatment and a negative value of Δb indicates that the sample becomes more blue after the treatment. Typically, if the Δb value is less than 1.3 and/or Δe value is less than 2.1, the PSA has good yellowing resistance.

The color metrics, such as the L, a, and b values, can be measured by instruments that can measure and assign numerical values to colors that correspond to what a human eye would see. Instruments that can detect the color metrics in this fashion are well known and readily available commercially. In some embodiments, the color metrics from the PSA are measured using spectrophotometers, such as the ones developed by HunterLab (Reston, VA). Methods for measuring the Δb and Δe values are also well known in the art, for example, ASTM D2244-11.

Peel Strength

In addition to the yellowing resistance benefits, the PSA of the present invention also synergistically demonstrates good mechanical performance, e.g., high peel strength. That is to say, the disclosed PSAs demonstrate an unexpected combination of yellowing resistance and mechanical performance. Peel strength is the average force required to remove an adhesive laminated under specified conditions on a substrate, from the substrate at constant speed and at a specified angle. Peel strength evaluations can be performed by testing 180° stainless steel peel for 20 minutes and for 24 hours according to the FINAT Test Method 1 (2018) ("FINAT-1"). When applied on polypropylene substrate, the PSA may demonstrate a peel strength from 1 N/inch to 20 N/inch on according to the FINAT-1 method, e.g., from 2 N/inch to 18 N/inch, from 3 N/inch to 15 N/inch, from 3 N/inch to 10 N/inch, and from 4 N/inch to 9 N/inch. In terms of upper limits, the PSA demonstrated a peel strength of less than 20 N/inch, less than 18 N/inch, less than 15 N/inch, or less than 12 N/inch on stainless steel substrate. In terms of lower limits, the PSA demonstrated peel strength of greater than 1 N/inch, greater than 2 N/inch, greater than 5 N/inch, or greater than 6 N/inch, on the stainless steel substrate.

Fluorescers

The PSAs of this disclosure comprise one or more fluorescers. A fluorescer is a compound that has the property of emitting light at one wavelength (or band of wavelengths) as a result of the absorption of light at a different (and typically shorter) wavelength (or band of wavelengths). The wavelength range of emitted fluorescent light is referred to as an emission band; the wavelength range of the absorbed light is referred to as an excitation band.

The inventors found, surprisingly, that adding one or more fluorescers to the PSA can confer yellowing resistance to the PSA as described above. In some embodiments, the fluorescer used is a benzoxazole derivative, a biphenyl derivative, or a combination thereof. In some embodiments, the fluorescer is a benzoxazole derivative comprising a vinyl group; it is believed that these types of fluorescer is especially useful in imparting UV yellowing resistance. For example, these compounds may absorb light in the ultraviolet and violet region (having a wavelength typically in the range of 340-370 nm) and remit light in the blue region (having a wavelength typically in the range of 420-470 nm). Without being bound by theory, fluorescers, such as OB-1 and 135(DT), which contains a vinyl group in the center of the chemical structure, are able to confer good yellowing resistance, indicating the presence of the vinyl group in the center of the chemical structure can enhance resistance to yellowing caused by UV (UV yellowing resistance). In some embodiments, the benzoxazole derivative used in the PSA is OB-1 (CAS NO.: 1533-45-5). In some embodiments, the benzoxazole derivative used in the PSA is 135(DT) (CAS NO.: 1041-00-5) or OB-1 (CAS NO.: 1533-45-5). In some embodiments, the fluorescers used in the PSA comprises less than 0.1 wt. % metal oxide, e.g., less than 0.5 wt. %, less than 0.2 wt. %, less than 0.1 wt. %, or less than 0.05 wt. %. Unexpectedly, the metal oxide fluorescers have been found to be ineffective in providing yellowing resistance.

OB-1 is represent by the formula:

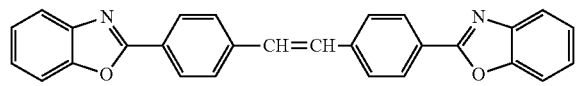

135(DT) is represented by the formula:

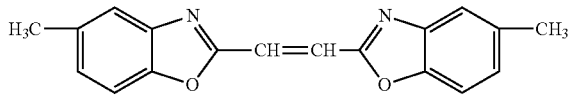

In some embodiments, the fluorescer is present in an amount ranging from 0.01 to 0.4 wt. % based on the solid weight of the pressure sensitive adhesive, e.g., from 0.02 to 0.3 wt. %, from 0.04 to 0.15 wt. %, from 0.05 to 0.2 wt. %, or from 0.06 to 0.1 wt. %, e.g., 0.08 wt. %. In terms of upper limits, the PSA can comprise a fluorescer in an amount of less than 0.3 wt. %, less than 0.2 wt. %, less than 0.15 wt. %. or less than 0.1 wt. %. In terms of lower limits, the PSA can comprise a fluorescer in an amount of greater than 0.02 wt. %, greater than 0.04 wt. %, greater than 0.05 wt. %, or greater than 0.06 wt. %.

Polyacryate Base Polymer

The polymer of the solvent-based PSA comprises a polyacrylate base polymer. Various acrylate polymers are known in the art. In some cases, the polymer may comprise a single type of acrylate monomer; while in other cases, the polymer may comprise a combination of different types of acrylate monomers. The presence of polyacrylate base polymer may contribute the undesirable phenomenon that the PSAs change color from being transparent to yellow, particularly with passage of time under heating, being exposed to UV, and/or other weathering conditions. The extent of yellowing vary depending on the types and purity of the monomers used to form the PSA. Adding fluorescers disclosed herein to the PSA will counter that effect and restore the PSA to the desired transparent appearance.

In some embodiments, the polyacrylate base polymer may comprise acrylate monomers that also include alkyl chains. These alkyl chains may vary widely, e.g., linear, branched, cyclical, aliphatic, aromatic, saturated, or unsaturated. The number of carbon atoms in the alkyl chain(s) of the acrylate monomer may vary, ranging from 1 to 20 carbon atoms, e.g., from 2 to 15, from 2 to 13, from 4 to 10, from 4 to 8 carbons. In preferred embodiments, these alkyl chains comprise no more than 20 carbon atoms, e.g., no more than 15 carbon atoms, no more than 12 carbon atoms, no more than 8 carbon atoms, no more than 6 carbon atoms, no more than 5 carbon atoms, or no more than 4 carbon atoms. In preferred embodiments these alkyl chains comprise greater than 1 carbon atom, e.g., greater than 1, greater than 3, greater than 4, or greater than 5 carbon atoms.

The polyacrylate base polymer, in some embodiments, has a glass transition temperature (Tg) within appropriate ranges and/or limits. The glass transition temperature defines the region where the polymer transitions from a hard, glassy material to a soft, rubbery material. In some embodiments, the polyacrylate base polymer having a Tg ranging from −40° C. to 0° C. (including the endpoints), e.g., from −40° C. to −15° C., from −35° C. to −15° C., from −35° C. to −20° C., from −31° C. to −25° C. In terms of lower limits, the Tg of the polyacrylate base polymer is higher than −40° C., e.g., higher than −35° C. or higher than −31° C. In terms of upper limits, the Tg of the polyacrylate base polymer is lower than −15° C., e.g., lower than −20° C., or lower than −25° C.

The average molecular weight of the polyacrylate base polymer may vary widely. In some cases, the average molecular weight may range from 50,000 to 1,500,000 g/mol, e.g., from 70,000 to 1,200,000 g/mole, from 100,000 to 600,000 g/mole, from 200,000 to 800,000 g/mole, from 300,000 to 600,000 g/mole or about 450,000. In terms of upper limits, the polyacrylate base polymer can have an average molecular weight of less than 1,500,000 g/mole, e.g., less than 800,000 g/mole, less than 600,000 g/mole. In terms of lower limits, the polyacrylate base polymer can have an average molecular weight of greater than 50,000 g/mole, e.g., greater than 100,000 g/mole, or less than 300,000 g/mole. In some embodiments, the polyacrylate base polymer contains from 2 to 40 wt. %, e.g., from 6 to 30 wt. %, from 10 to 20 wt. % of polymers having a molecular weight of 10,000 g/mole or less based on the total dry weight of the polyacrylate base polymer.

The polyacrylate base polymer may have a molecular weight distribution index (MWI) ranging from 2 to 8, e.g., from 2 to 7, from 3 to 6, from 2 to 5, from 1 to 4, from 2 to 3, from 3 to 4, or from 3 to 4. In terms of upper limits, the MWI is less than 8, less than 7, less than 6, less than 5. In terms of lower limits, the MWI is greater than 2, e.g., greater than 3, greater than 4, or greater than 5. Molecular weight distribution index refers to the broadness of a molecular weight distribution of a polymer, the larger the index, the broader the molecular weight distribution. Unless expressly noted otherwise, all percentages in this disclosure are weight percentages based on the total dry weight of the PSA.

The polyacrylate base polymer is present in an amount ranging from 80-99.9 wt. %, e.g., from 85 wt. % to 99.9 wt. %, from 90 wt. % to 99.8 wt. %, from 95 wt. % to 99.8 wt. %, e.g., about 99.6 wt. %, based on the total dry weight of the PSA. In terms of upper limits, the polyacrylate base polymer is present in an amount less than 100 wt. %, less than 99.9 wt. %. In terms of lower limits, the polyacrylate base polymer is present in an amount greater than 80 wt. %, e.g., greater than 85 wt. %, greater than 90 wt. %, or greater than 95 wt. %.

Suitable commercially available polyacrylate base polymers include, but are not limited to, Y-2310, Y-1510, Y-1310, Y-1500W, Y-1210, Y-2100 from YASUSA Chemical, BPS5375 from Toyo ink, Etrac7017B, Etarc77307, Etarac7709, Etarac7055 from Eternal, PS8249 and PS8245 from Sumei, Ulrta-Reclo 236A, Ulrta-Reclo 247A from Henkel, NC-310 from Soken. In some embodiments, the polyacrylate base polymer is produced by polymerizing one or more monomers selected from the group consisting of butyl acrylate, 2-ethylhexyl acrylate, methyl acrylate and acrylic, and 2-hydroxyethyl acrylate. These polyacrylate base polymers are typically available in solution, for example, Y-2310 has a solid content about 37%.

Crosslinker

The PSA of the present invention comprises one or more crosslinkers. This crosslinker functionally links one polymer chain to another.

In some embodiments, the crosslinker comprises isocyanate, epoxy, or combinations thereof. In some embodiments, the crosslinker is a chelate.

In some embodiments, the crosslinker is not a metal acetylacetonate, a metal alkoxide, or an alkoxy-metal acetylacetonate. In some embodiments, the crosslinker is not a chelate, i.e., the crosslinker is a non-chelate crosslinker. In some embodiments, the crosslinker is tetra-glycidyl m-xylene diamine. In some embodiment the crosslinker is Glycidyl ether of m-xylenediamine (GA240).

The PSA may comprise from 0.01-0.4 wt. % of the crosslinker, e.g., from 0.05 to 0.4 wt. %, from 0.1 wt. % to 0.4 wt. %, from 0.2 wt. % to 0.9 wt. %, from 0.25 wt. % to 1 wt. %, from 0.20 wt. % to 0.75 wt. %, from 0.25 wt. % to 0.70 wt. %, and from 0.30 wt. % to 0.5 wt. %, e.g., about 0.34 wt. % based on the total dry weight of the PSA. In terms of upper limits, the PSA comprises epoxy in an amount of less than 0.9 wt. %, less than 0.8 wt. %, less than 0.7 wt. %, less than 0.6 wt. %, and less than 0.5 wt. %, based on the total dry weight of the PSA. In terms of lower limits, the PSA comprises epoxy in an amount of greater than 0.05 wt. %, greater than o.1 wt. %, greater than 0.12 wt. %, greater than 0.15 wt. %, e.g., greater than 0.20 wt. %, greater than 0.25 wt. % based on the total dry weight of the PSA.

Suitable commercially available epoxy crosslinkers include, but are not limited to, Y-202 from YASUSA Chemical, BXX5983 from Toyoink. Suitable commercially available isocyanate crosslinkers include, but are not limited to, Desmodur L75, N75, N100, N3390 and Z4470 from Covestro; ISONATE 143L, PAPI580N from Dow. Additional examples of isocyanate includes, but not limited to, hexamethylene diisocyanate, isophorone diisocyanate, 1,4-cyclohexane bismethyl isocyanate, and 4,4-methylene-bis-cyclohexyl isocyanate.

In some embodiments, the combination of the unique fluroscers, polyacrylate base polymers, crosslinkers, and/or tackifiers as described above confers the surprising results of maintaining the non-yellowing appearance of the PSA. For example, the PSA may comprise a fluorescer comprising a benzoxazole derivative comprising a vinyl group; a crosslinker comprising epoxy resin, isocyanine, or combination thereof; and a polyacrylate base polymer produced by polymerizing one or more monomers selected from the group consisting of butyl acrylate, 2-ethylhexyl acrylate, methyl acrylate and acrylic, and 2-hydroxyethyl acrylate, and the pressure sensitive adhesive demonstrating a yellowing resistance $\Delta b$ value less than 1.3 and/or a yellowing resistance $\Delta e$ less than 2.1 as measured by ASTM D2244 (2018), and a peel strength ranging from 1 N/inch to 20 N/inch, as measured by FINAT Test Method 1 (2018). In some embodiments, the yellowing resistance is measured when the PSA is exposed to a temperature of 90° C. for 2 weeks or when exposed to ultraviolet light for at least one week.

In some embodiments, the PSA may comprise a comprise a polyacrylate base polymer, a crosslinker, wherein the crosslinker does not comprise a metal acetylacetonate, a metal alkoxide, or an alkoxy-metal acetylacetonate, and a fluorescer, wherein the fluorescer is present in an amount ranging from 0.01 to 0.4 wt. % and the fluorescer comprises less than 0.1 wt. % metal oxide based on the solid weight of the adhesive. The pressure sensitive adhesive may demonstrate a yellowing resistance $\Delta b$ value less than 1.3 and/or a yellowing resistance $\Delta e$ less than 2.1, as measured by ASTM D2244, or when exposed to a temperature of 90° C. for 2 weeks or when exposed to ultraviolet light for at least one week.

In some embodiments, the PSA may comprise a comprise a polyacrylate base polymer, a crosslinker that is present in an amount ranging from 0.05-0.4 wt. %, wherein the crosslinker does not comprise a metal acetylacetonate, a metal alkoxide, or an alkoxy-metal acetylacetonate, and a fluorescer, wherein the fluorescer is present in an amount ranging from 0.01 to 0.4 wt. %, the fluorescer comprises less than 0.1 wt. % metal oxide based on the solid weight of the adhesive, and wherein the fluorescer comprises at least one vinyl group. The pressure sensitive adhesive may demonstrate a yellowing resistance $\Delta b$ value less than 1.3 and/or a yellowing resistance $\Delta e$ less than 2.1, as measured by ASTM D2244, or when exposed to a temperature of 90° C. for 2 weeks or when exposed to ultraviolet light for at least one week.

Tackifier

In some embodiments, the PSA comprises a special kind of tackifier, which does not impair the yellowing resistance of the PSA. These tackifiers are referred to yellowing resistance tackifiers. These tackifiers include but not limited to, a pure monomer resin, a hydrogenated resin, or combinations thereof. A pure monomer resin refers the aromatic resin synthesized by controllable raw material and these aromatic tackifiers have a very light color, along with excellent oxidative stability. A hydrogenated rosin resin refers to by using hydrogen molecules into the double bonds of the rosin ester, the resin ester enhance the resistance to oxidation and improves its color. Other kinds of tackifiers, e.g., rosin (GA100) and Terpene phenolic resin (TP2040) may cause the PSA to become yellow over time. Thus, to maintain the yellowing resistance, it is desirable to keep the PSA free (i.e., comprising less than 0.1 wt. %) of these tackifiers.

The PSA of the present invention comprises one or more yellowing resistant tackifiers to increase peel adhesion. In preferred embodiments, the PSA comprises 0.5 wt. % to 40 wt. % of the tackifier, e.g., from 0.5 wt. % to 1 wt. %, from 1 wt. % to 5 wt. %, from 1 wt. % to 10 wt. %, from 4 wt. % to 8 wt. %, from 5 wt. % to 15 wt. %, from 10 wt. % to 20 wt. %, and from 10 wt. % to 30 wt. %. In terms of upper limits, the PSA comprises one or more tackifiers in an amount of less than 40 wt. %, less than 30 wt. %, less than 20 wt. %, or less than 10 wt. %. In terms of lower limits, the PSA comprises the one or more tackifiers in an amount of greater than 1 wt. %, greater than 4 wt. %, greater than 5 wt. %, or greater than 10 wt. %. In terms of upper limits, the PSA comprises the one or more tackifiers in an amount of less than 30 wt. %, less than 20 wt. %, less than 15 wt. %.

Exemplary commercially available tackifiers that are suitable for use in the PSA disclosed herein include Pure100 and Pure 85AS from Rutgers, Sylvalite RE 105XL from Arizona, and Y-7935 from Yasusa.

Laminate Composition

The disclosure also provides a laminate composition that comprise the PSA disclosed above. The laminate composition may comprise a facestock layer and an adhesive layer comprising the PSA as disclosed herein. In some cases, the laminate composition further comprises a topcoat layer disposed on the top of the facestock layer. In some cases, the laminate composition further comprises one or more primer layers and/or a liner, as further described below. The disclosure also contemplates labels that comprise the laminate compositions.

Facestock Layer

The laminate composition may have one or more facestock layers. In one embodiment, from the perspective of looking downward to the substrate, the facestock layer is on the top surface of the label, exposed to the environment and is configured to receive printable information, such as barcode or alphanumeric characters.

In some embodiments, the pressure sensitive adhesive is disposed in the form of a flat layer (optionally as a layer in the laminate composition). The flat layer has a thickness in the range of 8-80 microns, e.g., from 12 to 50 microns, from 10 to 60 microns, from 20-70 microns, from 30-60 microns, or from 20 to 50 microns, or other ranges in the foregoing amounts. In terms of lower limits, the PSA layer may have a thickness of at least 8 micron, e.g., at least 10 microns, at least 20 microns, or at least 30 micros. In terms of upper limits, the polyolefin films may have a thickness less than 80 microns, e.g., less than 70 microns, less than 60 microns, or less than 50 microns.

The facestock layer can include, for example, glassine, kraft, and polyesters, such as polyethylene terephthalate (PET), polyamides (PA), polyethylene naphthalate (PEN), cotton, tissue, paper, fiberglass, synthetic textiles, and polyolefins, such as polypropylene (PP), ethylene-propylene copolymers, polyethylene (PE), and combinations thereof. Other polymeric film materials include urethane based polymers such as polyether urethane and polyester urethane; amide based polymers including polyether polyamide copolymers; acrylic based polymers including a polyacrylate, and ethylene/vinyl acetate copolymer; polyester based polymers including a polyether polyester; a vinyl chloride; a vinylidene chloride; a polystyrene; a polyacrylonitrile; a polycarbonate; a polyimide; ABS; polyacrylate; polycarbonate (PC); polyamide; polyimide (PI); polyamidoimide; polyacetal; polyphenylene oxide (PPO); polysulfone, polyethersulfone (PES); polyphenylene sulfide; polyether ether ketone (PEEK); polyetherimide (PEI); metallized polyethylene terephthalate (PET); polyvinyl fluoride (PVF); polyethylene ether (PEE); fluorinated ethylene propylene (FEP); polyurethane (PUR); liquid crystal polymers (LCPs, class of aromatic polyester); polyvinylidene fluoride (PVDF); aramid fibers; DIALAMY, (polymer alloys); polyethylene naphthalate (PEN); ethylene/tetrafluoroethylene; (E/TFE); polyphenyl sulfone (PPSU); and polymers or polymer alloys containing one or more of these materials.

The thickness or coating weight of the facestock layer may vary depending on the stiffness of the label desired for particular applications. The facestock layer according to certain embodiments of the present invention may comprise a thickness ranging from 100 to 1,000 microns, e.g., from 200 to 800 microns, from 150 to 500 microns, from 300-600 microns, or from 450 to 900 microns, or other ranges in the foregoing amounts. In terms of lower limits, the facestock layer may have a thickness of at least 100 micron, e.g., at least 150 microns, at least 200 microns, or at least 300 micros. In terms of upper limits, the polyolefin films may have a thickness less than 1000 microns, e.g., less than 800 microns, less than 500 microns, less than 400 microns, or less than 300 microns. In some embodiments, the facestock layer is 125 microns.

In some embodiments, the laminate composition comprises a topcoat layer disposed on the top of the facestock layer. The topcoat may enhance printing performance, durability and/or chemical resistance. In one embodiment, the topcoat layer of the label typically comprises a resin. Non-limiting examples of the resins that are suitable for use as topcoat include polyester-amino resin and a phenoxy resin, polyester-isocyanate, polyurethane, and polyacrylate. In some embodiments, the topcoat may possess one or more additional properties such as UV-resistance and anti-scratch property.

In some embodiments, the topcoat layer may also be configured to be receptive to printing. For example, the topcoat layer may comprise one or more printable layers containing an ink-receptive composition that is utilized to form the printable information. A variety of such compositions are known in the art, and these compositions generally include a binder and a pigment, such as silica or talc, dispersed in the binder. Optionally, the printable layer comprises a crosslinker CX-100 (DSM's polyfunctional aziridine liquid crosslinker). A number of such ink-receptive compositions are described in U.S. Pat. No. 6,153,288, the disclosure of which is hereby incorporated by reference. Printable information can be deposited on the facestock layer using various printing techniques, such as screen printing, dot-matrix, ink jet, laser printing, laser marking, thermal transfer, and so on. In some cases, the facestock layer is receptive to thermal transfer printing.

The inks used for printing on the topcoat layer may vary widely and may include commercially available water-based, solvent-based or radiation-curable inks. Examples of these inks include Sun Sheen (a product of Sun Chemical identified as an alcohol dilutable polyamide ink), SUN-TEX® MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In some cases, the printable layer may be a layer that utilizes activatable inks, e.g., stimulus-activatable inks, such as (for example) laser-activated, pressure-activated, or temperature-activated inks.

The topcoat layer, in accordance with certain embodiments of the present invention, may be applied onto the facestock portion of the facestock layer by any known techniques in the art, such as spray, roll, brush, or other techniques. The printable layer can be formed by depositing, by gravure printing or the like, on the topcoat layer, with the bottom surface in contact with the top surface of the topcoat layer.

Other (Optional) Components

In some cases, the PSAs, facestock layer, topcoat layer, or primer layer may optionally include one or more fillers, antioxidants, UV-absorbers, photo-stabilizers, and/or fillers. These additives may be incorporated into the adhesive in conventional quantities using conventional equipment and techniques. For example, representative fillers can include talc, calcium carbonate, organo-clay, glass fibers, marble dust, cement dust, feldspar, silica or glass, fumed silica, silicates, alumina, various phosphorus compounds, ammonium bromide, titanium dioxide, antimony trioxide, antimony trioxide, zinc oxide, zinc borate, barium sulfate, silicones, aluminum silicate, calcium silicate, glass microspheres, chalk, mica, clays, wollastonite, ammonium octamolybdate, intumescent compounds and mixtures of two or more of these materials. The fillers may also carry or contain various surface coatings or treatments, such as silanes, fatty acids, and the like. Still other fillers can include flame-retardant agents, such as the halogenated organic compounds. In certain embodiments, the topcoat layer may include one or more thermoplastic elastomers that are compatible with the other constituents of the layer, such as etherified melamine, hydroxylated polyester, polyester-melamine, and other suitable elastomers.

Optionally, the label disclosed herein comprises one or more primer layers and the one or more primer layers may be situated between the facestock layer and the adhesive layer.

Liner

In some embodiments, the label further includes a liner deposited on the opposite side of the surface of the reactive adhesive layer that contacts the facestock layer. A releasable liner can be positioned adjacent to the reactive adhesive layer such that the reactive adhesive layer is disposed, or sandwiched, directly or indirectly between the bottom surface of facestock layer and the releasable liner. The releasable liner may function as a protective cover such that the release liner remains in place until the label is ready for attachment to an object. If a liner or release liner is included in the label, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release material-coated face of the liner is placed in contact with the otherwise exposed face of the adhesive layer. Prior to application of the label to a surface of interest, the liner is removed to thereby expose the adhesive face of the label. The liner can be in the form of a single sheet. Alternatively, the liner can be in the form of multiple sections or panels.

The liner used in the label may have a thickness ranging from 20 to 150 micron, e.g., from 30 to 120 micron, from 60 to 100 micron, or from 50 to 90 micron. In terms of upper limits, the thickness of the label is less than 150 micron, e.g., less than 130 micron, or less than 100 micron. In terms of lower limits, the thickness of the label is greater than 20 micron, e.g., greater than 30 micron, or greater than 40 micron.

Various additives can also be added to one or more of the facestock layer, the primer layer, the adhesive layer, or liner layers to obtain a certain desired characteristic. These additives can include, for example, one or more waxes, surfactants, talc, powdered silicates, filler agents, defoamers, colorants, antioxidants, UV stabilizers, luminescents, crosslinkers, buffer agents, anti-blocking agents, wetting agents, matting agents, antistatic agents, acid scavengers, flame retardants, processing aids, extrusion aids, and others.

Adhesive Solution

This disclosure also provides an adhesive solution which comprises a solvent, a polyacrylate base polymer (typically in solution form, e.g., a polyacryate base polymer may comprise 35 wt. % solid and 65 wt. % solvent), a crosslinker (that is not a metal acetylacetonate, a metal alkoxide, or an alkoxy-metal acetylacetonate), and a fluorescer (comprising less than 0.1 wt. % metal oxide) as disclosed above. The solvent that can be used to produce the PSA disclosed herein may be one or more solvents selected from the group consisting of toluene, ethyl acetate, isopropanol, xylene, n-hexane, n-heptane, methyl cyclohexane, butyl acetate, acetone, butanone, and 2-Acetoxy-1-methoxypropane.

The polyacrylate base polymer solution is present in an amount ranging from 60-90 wt. %, e.g., from 70 wt. % to 90 wt. %, from 75 wt. % to 85 wt. %, e.g., about 80 wt. %, based on the total weight of the pressure sensitive adhesive solution. In terms of upper limits, the PSA comprises polyacrylate base polymer in an amount of less than 90 wt. %, less than 85 wt. %, based on the total weight of the PSA solution. In terms of lower limits, the PSA comprises polyacrylate base polymer in an amount of greater than 70 wt. %, e.g., greater than 75 wt. %, based on the total weight of the PSA solution.

The amount of solvent(s) used for producing the adhesive solution may vary depending on the desired viscosity that is suitable for coating on the substrate or other layers. Typically, the solvent is present in the adhesive solution in an amount ranging from 10 to 40 wt. %, e.g., e.g., from 8 to 45 wt. %, from 10 to 40 wt. %, from 15 to 25 wt. %, e.g., about 19 wt. %. In terms of lower limits, the solvent is present in an amount of greater than 5 wt. %, e.g., greater than 8 wt. %, greater than 10 wt. %, or greater than 12 wt. %, or greater than 15 wt. %, based on the total weight of the adhesive solution. In terms of upper limits, the solvent is present in an amount of less than 40 wt. %, less than 30 wt. %, or less than 25 wt. %, based on the total weight of the adhesive solution.

Production of the PSA

The present invention also relates to methods of producing a PSA. The methods include dissolving in a solvent, a polyacrylate base polymer, a crosslinker (that is not a metal acetylacetonate, a metal alkoxide, or an alkoxy-metal acetylacetonate), and a fluorescer (comprising less than 0.1 wt. % metal oxide) to form an adhesive solution. Any of the aforementioned embodiments of the polyacrylate base polymer, the cross-linker, and the fluorescer can be used to produce an adhesive solution. An exemplary PSA solution is shown in Table 1. This process is commonly referred to as compounding. The compounding can occur under a temperature less than 50° C., e.g., between 20° C. and 40° C., or between 20° C. and 30° C., or under any temperature below the triggering temperature for curing.

A variety of solvents can be used to dissolve the components of the PSA. Suitable solvents include those that demonstrate proper evaporation rate and in which the various components show good solubility. In preferred embodiments, the solvent is a petroleum-based solvent. Suitable solvents include but are not limited to, aromatic solvents, aliphatic solvents, ester solvents, xylene, ethyl benzene, isopropyl alcohol, and combinations thereof. Examples of aromatic solvents include aromatic rings with alkyl substitution (e.g. toluene). Examples of ester solvents include esters of 3 or more carbon atoms (e.g. methyl acetate, or ethyl acetate). In some embodiments, two or more solvents can be used to dissolve various components above to produce the adhesive solution.

The adhesive solution, as prepared above, has good coatability with a typical viscosity from 100 to 5,000 cps, e.g., from 200 to 4,000 cps, from 300 to 3,000 cps, from 400 to 2,000 cps, from 300 to 600 cps, or about 500 cps. In terms of lower limits, the viscosity is greater than 100, e.g., greater than 200 cps, greater than 300 cps, or greater than 400 cps. In terms of upper limits, the viscosity is less than 5,000, less than 4,000 cps, less than 2,000 cps, less than 1,000 cps. Methods for measuring viscosity are well known, for example using the Brookfield Viscometer method, testing the flow resistance of the fluid by low and medium rate rotation.

In some embodiments, the adhesive solution as produced above can then be coated onto a facestock using a solvent coater by knife over roll, slot die, or comma coating. The solution may be coated to form an adhesive layer having a coat weight of at least 5 grams per square meter (gsm), e.g., at least 10 gsm or at least 15 gsm. In terms of upper limits, the solution may be coated to form an adhesive layer having a coat weight of 60 gsm or less, e.g., 50 gsm or less, or 40 gsm or less. In terms of ranges, the solution may be coated to form an adhesive layer having a coat weight from 5 to 60 gsm, e.g., from 10 to 50 gsm or from 15 to 40 gsm, depending on the end use of the adhesive layer. The facestock/liner coated with the solution above then can be dried as further described below and processed into labels. In some cases, it is used as a transfer adhesive without being associated with a facestock.

The coating process is typically performed in an oven having multiple temperature zones, e.g., at least 2 zones, at least 3 zones, at least four zones, at least five zones, or at least six zones. The temperature zones may range from 30 to 200° C., e.g., from 40 to 150° C. or from 60 to 130° C. The temperature may increase from the first to last zone, though multiple zones may be at the same temperature.

Once coated, the adhesive may be dried in an oven, for a predetermined drying time. The drying oven can have a temperature of greater than 100° C. The rate of solvent evaporation increases with temperature. The drying time can be at least 2 minutes, at least 4 minutes, at least 6 minutes, at least 8 minutes, at least 10 minutes, at least 15 minutes, at least 20 minutes, at least 25 minutes, at least 30 minutes, at least 40 minutes, at least 50 minutes, or at least 1 hour.

In some embodiments, the adhesive can is laminated onto a liner. Suitable liners are described above.

Labeling Articles

The present invention also relates to methods of applying a label comprising the PSA to an article. The present invention also provides labeled articles. The methods include providing an article defining an outer surface, and a label in accordance with an embodiment. The methods further include affixing the label to the outer surface of the article, thereby applying the label to the article. In some embodiments, the article is a steel panel or a window, e.g., the steel panel or a window of an automobile. The adhesive can be affixed to the cover.

The labels can be affixed to the articles in a batch, continuous, or semi-continuous fashion. Prior to application, one or more liners can be removed from the labels to thereby expose the adhesive face of the labels. The adhesive face and label is then contacted with the container(s) or article(s) and the labels applied thereto. Adhering may also include one or more operations of pressing or otherwise applying a pressing force against the label to promote contact and/or adhesion with the container; activating and/or curing of the adhesive such as by heating and/or exposure to UV light; and/or drying operations.

Adhesive System

Typically, when in storage, the solution containing the polyacrylate base polymer, optionally also the fluorescer, is kept separate from the crosslinkers to prevent undesired crosslinking. The crosslinkers can be added to the solution containing the polyacrylate base polymer immediately prior to the producing of the adhesive and/or the labels. Thus, also provided is an adhesive system comprising: a) a polycrylate base polymer; b) a crosslinker, wherein the crosslinker is not a metal acetylacetonate, a metal alkoxide, or an alkoxy-metal acetylacetonate; and c) a fluorescer, wherein the fluorescer comprises less than 0.1 wt. % metal oxide; and wherein the crosslinker is separate from the polyacrylate base polymer.

The materials in the adhesive system may be present in the amounts such that the PSAs produced have the properties described in this disclosure.

Embodiments

This invention is further illustrated by the following exemplary embodiments.

Embodiment 1: A pressure sensitive adhesive comprising:
a polyacrylate base polymer,
a crosslinker, wherein the crosslinker does not comprise a metal acetylacetonate, a metal alkoxide, or an alkoxy-metal acetylacetonate,
a fluorescer, wherein the fluorescer comprises less than 0.1 wt. % metal oxide based on the solid weight of the adhesive.

Embodiment 2: The pressure sensitive adhesive of embodiment 1, wherein the pressure sensitive adhesive demonstrates a peel strength of at least 1 N/inch to 20 N/inch, as measured by FINAT Test Method 1 (2018).

Embodiment 3: The pressure sensitive adhesive of embodiment 1 or 2, wherein the pressure sensitive adhesive demonstrates a yellowing resistance $\Delta b$ value less than 1.3 and/or a yellowing resistance $\Delta e$ less than 2.1, as measured by ASTM D2244, or when exposed to a temperature of 90° C. for 2 weeks or when exposed to ultraviolet light for at least one week.

Embodiment 4: The pressure sensitive adhesive of any one embodiments 1-3, wherein the fluorescer is present in an amount ranging from 0.01 to 0.4 wt. % based on the solid weight of the pressure sensitive adhesive.

Embodiment 5: The pressure sensitive adhesive of any one embodiments 1-4, wherein the fluorescer is present in an amount ranging from 0.02-0.3 wt. % based on the solid weight of the pressure sensitive adhesive.

Embodiment 6: The pressure sensitive adhesive of any of embodiments 1-5, wherein the crosslinker is present in an amount ranging from 0.05-0.4 wt. %, based on the solid weight of the PSA.

Embodiment 7: The pressure sensitive adhesive of any one of embodiments 1-6, wherein the pressure sensitive adhesive is disposed in the form of a flat layer and wherein the flat layer has a thickness in the range of 8-80 μm.

Embodiment 8: The pressure sensitive adhesive of any one of embodiments 1-7, wherein the fluorescer is a compound having at least one vinyl group.

Embodiment 9: The pressure sensitive adhesive of any one of embodiments 1-7, wherein the fluorescer comprises a benzoxazole derivative or a biphenyl derivative or a combination thereof.

Embodiment 10: The pressure sensitive adhesive of embodiment 9, wherein the benzoxazole derivative is OB-1 or 135 (DT).

Embodiment 11: The pressure sensitive adhesive of any one of embodiments 1-10, wherein the fluorescer is OB, and wherein the adhesive demonstrates a yellowing resistance Δb value less than 1.3 and/or a yellowing resistance Δe less than 2.1, as measured by ASTM D2244, when exposed to a temperature of 90° C. for 2 weeks.

Embodiment 12: The pressure sensitive adhesive of any one of embodiments 1-11, wherein the pressure sensitive adhesive is essentially free of chlorinated polyolefin.

Embodiment 13: The pressure sensitive adhesive of any of embodiments 1-12, wherein the crosslinker comprises an isocyanate, an epoxy, or a combination thereof.

Embodiment 14: The pressure sensitive adhesive of any of embodiments 1-13, wherein the fluorescer comprises a benzoxazole derivative comprising a vinyl group, and wherein the pressure sensitive adhesive demonstrates a yellowing resistance b value less than 1.3, as measured by ASTM D2244 (2018) when exposed to ultraviolet light for at least one week.

Embodiment 15: The pressure sensitive adhesive of any of embodiments 1-14, wherein the fluorescer comprises a benzoxazole derivative and wherein the pressure sensitive adhesive demonstrates a yellowing resistance Δb value less than 1.3 and/or a yellowing resistance Δe less than 2.1 as measured by ASTM D2244, when exposed to a temperature of 90° C. for 2 weeks or when exposed to ultraviolet light for at least one week.

Embodiment 16: The pressure sensitive adhesive of any of embodiments 1-14, wherein the pressure sensitive adhesive has a peel strength of 1-20 N/inch, as measured by FINAT Test Method 1 (2018).

Embodiment 17: The pressure sensitive adhesive of any of embodiments 1-15, wherein the fluorescer comprises a benzoxazole derivative comprising a vinyl group, wherein the crosslinker comprises epoxy resin, isocyanine, or combination thereof, and wherein the polyacrylate base polymer is produced by polymerizing one or more monomers selected from the group consisting of butyl acrylate, 2-ethylhexyl acrylate, methyl acrylate and acrylic, and 2-hydroxyethyl acrylate, and wherein the pressure sensitive adhesive demonstrates a yellowing resistance Δb value less than 1.3 and/or a yellowing resistance Δe less than 2.1 as measured by ASTM D2244 (2018), and a peel strength ranging from 1 N/inch to 20 N/inch, as measured by FINAT Test Method 1 (2018).

Embodiment 18: The pressure sensitive adhesive of any of embodiments 1-17, wherein the crosslinker comprises tetra-glycidyl m-xylene diamine.

Embodiment 19: The pressure sensitive adhesive of any of embodiments 1-18, wherein the polyacrylate base polymer is synthesized by polymerization of one or more monomers of butyl acrylate, 2-ethylhexyl acrylate, methyl acrylate and acrylic, and 2-hydroxyethyl acrylate.

Embodiment 20: The pressure sensitive adhesive of any of embodiments 1-19, wherein the PSA further comprises a tackifier, wherein the tackifier is a pure monomer resin, a hydrogenated resin, or combinations thereof.

Embodiment 21: The pressure sensitive adhesive of any one embodiments 1-20, wherein the pressure sensitive adhesive, when exposed to a temperature of 90° C. for 2 weeks or when exposed to ultraviolet light for at least one week, demonstrates a Δb value less than 5.

Embodiment 22: A laminate composition comprising a facestock layer and a pressure sensitive adhesive layer comprising the pressure sensitive adhesive of any one of embodiments 1-21.

Embodiment 23: The laminate composition of embodiment 22, wherein the facestock layer is a film comprising one or more resins selected from the group consisting of polyester, ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY, (polymer alloys), polyethylene naphthalate (PEN), ethylene/tetrafluoroethylene, (E/TFE), polyphenyl sulfone (PPSU).

Embodiment 24: The laminate composition of any of embodiments 22-23, wherein the laminate further comprises a topcoat layer disposed on top of the facestock layer.

Embodiment 25: The laminate composition of any of embodiments 22-24, wherein the laminate is disposed in the form of a flat layer, and wherein the flat layer has a thickness in the range of 8-80 μm.

Embodiment 26: The laminate composition of any of embodiments 22-24, wherein one or more of the pressure sensitive adhesive layer, the facestock layer, and the topcoat layer demonstrate a yellowing resistance Δb value less than 1.3 and/or a yellowing resistance Δe less than 1.5, as measured by (2018) or when exposed to a temperature of 90° C. for 2-3 weeks or when exposed to ultraviolet light for at least one week.

Embodiment 27: A label comprising the pressure sensitive adhesive of any of embodiments 1-21 or the laminate composition of embodiments 22-26.

Embodiment 28: A method for increasing yellowing resistance to a pressure sensitive adhesive comprising
  adding a fluorescer to a composition comprising a polyacrylate base polymer, and a crosslinker,
  wherein the fluorescer comprises less than 0.1 wt. % metal oxide, and wherein the crosslinker does not comprise a metal acetylacetonate, a metal alkoxide, or an alkoxy-metal acetylacetonate.

Embodiment 29: A method for producing a yellowing resistance pressure sensitive adhesive solution comprising: dissolving in a solvent
  a) a polycrylate base polymer;
  b) a crosslinker, wherein the crosslinker does not comprise a metal acetylacetonate, a metal alkoxide, or an a alkoxy-metal acetylacetonate, and
  c) a fluorescer,
wherein the fluorescer comprises less than 0.1 wt. % metal oxide.

Embodiment 30: The method of embodiment 29, wherein the fluorescer comprises a benzoxazole derivative or a biphenyl derivative or a combination thereof.

Embodiment 31: The method of embodiment 29-30, wherein the pressure sensitive adhesive demonstrates a yellowing resistance Δb value less than 1.3 and/or a yellowing resistance Δe less than 2.1 as measured by ASTM D2244 (2018).

Embodiment 32: The method of any of embodiments 29 or 30, wherein the solvent is selected from the group consisting of toluene, ethyl acetate, isopropanol, xylene, n-hexane, n-heptane, methyl cyclohexane, butyl acetate, acetone, butanone, and 2-Acetoxy-1-methoxypropane.

Embodiment 33: The pressure sensitive adhesive of any of embodiments 29-32, wherein the crosslinker comprises epoxy, isocyanate, or combinations thereof.

Embodiment 34: The method of any of embodiments 29-33, wherein the method further comprises the step of coating a facestock with the PSA solution, and drying the pressure sensitive adhesive solution to produce a label.

Embodiment 35: The method of any of embodiments 29-34, wherein the method further comprises applying the label to an article, wherein the article is a steel panel.

Embodiment 36: A pressure sensitive adhesive solution comprises
  a polyacrylate base polymer solution,
  a crosslinker, wherein the crosslinker does not comprise a metal acetylacetonate, a metal alkoxide, or an alkoxy-metal acetylacetonate,
  a fluorescer, wherein the fluorescer comprises less than 0.1 wt. % metal oxide, and
  a solvent.

Embodiment 37: The pressure sensitive adhesive solution of embodiment 36, wherein the polyacylate base polymer solution is present in an amount ranging from 60-90% based on the total weight of the pressure sensitive adhesive solution.

Embodiment 38: The pressure sensitive adhesive solution of embodiment 36-37, wherein the solvent is present in an amount ranging from 10-40 wt. % based on the total weight of the pressure sensitive adhesive solution.

EXAMPLES

The following examples are offered to illustrate, but not to limit the claimed invention.

Example I

Three exemplary PSA solutions having the ingredients as listed in Table 1 were prepared. The values in Table 1 represent the weight percentages of the individual components based on the total weight of the PSA solution. Each of the PSA solutions was coated on a liner to dry. After dying, the liner was peeled off, and the dry PSA was transferred to a facestock to form a laminate. The laminates comprising the PSAs were aged at 90° C. for two weeks. The L, a, b of the sample before heating and after heating were measured according to HunterLab. The results are shown in Table 1.

TABLE 1

| | Adhesive Solutions | | | | | |
|---|---|---|---|---|---|---|
| | Example/Comparative | | | | | |
| | A | | 1 | | 2 | |
| | wet | dry | wet | dry | wet | dry |
| Basepolymer 2310 (37% solid) | 80 | 99.6 | 80 | 99.6 | 80 | 99.6 |
| Crosslinker GA240 (50% solid) | 0.2 | 0.34 | 0.2 | 0.34 | 0.2 | 0.34 |
| Toluene | 19 | — | 19 | — | 10 | — |
| Fluorescer OB-1 | | | 0.025 | 0.08 | | |
| Fluorescer 135(DT) | | | | | 0.025 | 0.08 |
| | Before | After | Before | After | Before | After |
| a value | −0.85 | −0.166 | −0.59 | −0.62 | −1.72 | −.098 |
| b value | 2.5 | 4.52 | 1.57 | 2.67 | 3.91 | 3.01 |
| L value | 96.32 | 96.03 | 96.49 | 96.1 | 96.17 | 96.17 |
| Δb | 2.02 | | 1.1 | | −0.9 | |

The results show that Examples 1 and 2, comprising OB-1 and 135 (DT), respectively, showed a Δb of 1.1, and −0.9, both below the threshold of 1.3, after the 90° C. temperature treatment, indicating that they possess thermal yellowing resistance. In contrast, Comparative Example A showed a higher Δb of 2.02 after the temperature treatment, indicating that the PSA is susceptible to yellowing under high temperature. The columns "dry" in both Tables 1 and 2 show the percentages of solid weight of the components relative to the solid weight of the PSA. The columns "wet" show the percentages of the wet weight of the components relative to the total weight of the PSA solution.

Additional Examples 3, 4, and 5 were prepared as discussed above and using the compositions shown in Table 2. The Examples were tested for yellowing resistance as discussed above—the results are presented in Table 2.

TABLE 2

| | Example/Comparative | | | | | |
|---|---|---|---|---|---|---|
| | 3 | | 4 | | 5 | |
| | wet | dry | wet | dry | wet | dry |
| Basepolymer 2310 (37% solid) | 80 | 99.6 | 80 | 99.6 | 80 | 99.6 |
| Crosslinker GA240 (50% solid) | 0.2 | 0.34 | 0.2 | 0.34 | 0.2 | 0.34 |
| Toluene | 19 | | 19 | | 19 | |
| Fluorescer OB (Benzoxazole derivative) | 0.025 | 0.08 | | | | |
| Fluorescer FP-127 CAS NO.: 40470-68-6 (Diphenyl derivative) | | | 0.025 | 0.08 | | |
| Fluorescer CAS NO. 27343-86-8 (Diphenyl derivative) | | | | | 0.025 | 0.08 |

| | Before | After | Before | After | Before | After |
|---|---|---|---|---|---|---|
| a value | −0.71 | −0.56 | −0.59 | −0.62 | −1.72 | −1.88 |
| b value | −0.12 | 0.11 | 1.37 | 2.67 | 2.91 | 3.81 |
| L value | 96.12 | 96.03 | 96.69 | 95.3 | 96.96 | 96.1 |
| Δb | 0.23 | | 1.3 | | 0.9 | |
| ΔE | 0.289 | | 1.9 | | 1.26 | |

As shown in in Table 2, the Example PSAs containing each of the three fluorescers, i.e., OB, FP-127, Dicyandiphenylethene (CAS. NO. 27343-86-8) all showed good thermal yellowing resistance, with OB being the best in terms of the relative capability of conferring thermal yellowing resistance.

Additional PSAs were prepared using solutions having the same polyacrylate base and crosslinker and in the same concentrations as shown in Table 1. The fluorescers used in the PSAs were OB, OB-1, 135 (DT) and KCB, which were used in concentrations listed in Table 3. Toluene was used as solvent and made up for the rest of the PSA solution. The Example PSAs were tested and the test results are shown in Table 3.

The PSAs were produced and exposed to UV for 12 days in the QUV® spray tester for a test period according to the SAE J2020 test conditions. Each cycle of the test period included a 4-hour UVB irradiation, at an intensity of 0.63 W/m2/nm using UVB 313-EL lamps at 60° C., and a subsequent 4-hour condensation at 50° C. Test samples were monitored periodically for changes in appearance.

The L, a, b values of the samples were measured at day 5, 6, 7, 8, 9, 10, 11, and 12 after the initiation of UV treatment. Δe values were calculated.

As shown in Table 3, Exemplary PSAs containing OB-1 or 135(DT) showed Δe levels of less than 2.1, i.e., being equal to 2 or less than 2. In contrast, Comparative PSAs containing OB or 135(DT) showed ΔE values in the range of 2.5-4.7. This shows that the fluorescers of the present disclosure, e.g., OB-1 and 135(DT), surprisingly provide improved yellowing resistance, e.g., maintain the non-yellow appearance, while the comparative examples that use other flourescer compound do not demonstrate the beneficial yellowing resistance.

The structures of the OB and KCB are shown below.

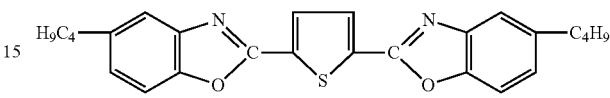

OB (CAS NO. 7128-64-5)

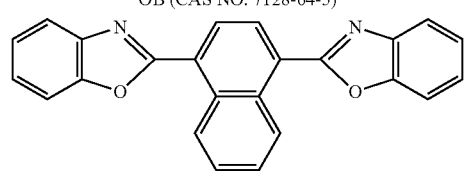

KCB (CAS NO. 5089-22-5)

Without being bound by theory, it is believed that the presence of a vinyl group, e.g., in the center of the chemical structure, for example as in both OB-1 and 135(DT), provides for the ability to confer good yellowing resistance. This may indicate that the presence of the vinyl group in the center of the chemical structure can enhance resistance to yellowing caused by UV (UV yellowing resistance). Thus, in some embodiments, the flouresce may be a compound having a vinyl group, e.g., positioned in the center of the chemical structure. The comparative flourescers do not contain such a vinyl group and, as such, do not provide improved yellowing resistance.

Example II. Effect of Tackifiers on Yellowing Resistance of PSA

Five exemplary PSAs having the ingredients as listed in Table 4 were prepared. The values in Table 4 represent the weight percentages of the individual components based on the total weight of the PSA solution. All PSAs contain OB-1 as the fluorescer. Example 8 does not contain any tackifier. Examples 9-12 contain different types of tackifiers as indicated. Each of the adhesive solutions was coated on a liner to dry. After drying, the liner was peeled off, and the dry

TABLE 3

Δe value (UV yellowing resistance)

| Benzoxazole derivative Code | Dosage of Fluorescers (wt. %) | Δe 5 Days | Δe 6 Days | Δe 7 Days | Δe 8 Days | Δe 9 Days | Δe 10 Days | Δe 11 Days | Δe 12 Days |
|---|---|---|---|---|---|---|---|---|---|
| OB | 0.08 | 4.7 | 4.7 | 4.7 | 4.5 | 4.5 | 4.15 | 4.04 | 3.65 |
| Comp. B | 0.16 | 3.45 | 3.6 | 3.5 | 3.3 | 3.3 | 2.93 | 2.83 | 2.52 |
| KCB Comp. C | 0.08 | 4.08 | 3.79 | 3.76 | 3.84 | 3.73 | 3.43 | 3.36 | 3.21 |
| OB-1 Example 6 | 0.08 | 0.88 | 1 | 1.1 | 0.8 | 0.9 | 0.62 | 0.47 | 0.67 |
| 135(DT) Example 7 | 0.08 | 1.88 | 2 | 2 | 1.8 | 1.9 | 1.47 | 1.3 | 1.09 |

(Lower value indicate better UV yellowing resistance)

PSA was applied to a TPU film by transfer coat with dry coat weight of 35 gsm to produce labels. The labels were affixed to white painted steel panels. The labeled panels were placed at 90° C. for 15 days and the L, a, b of the sample before heating and after heating were measured according to HunterLab. The results are shown in Table 4.

TABLE 4

Effect of tackifiers on yellowing resistance of PSAs

| Example | 8 | 9 | 10 | 11 | 12 |
|---|---|---|---|---|---|
| NC310 (33% solid) | 81.6 ± 0.5 | 81.6 ± 0.5 | 81.6 ± 0.5 | 81.6 ± 0.5 | 81.6 ± 0.5 |
| 10% GY240 | 0.4 | 0.4 | 0.4 | 0.4 | 0.4 |
| 甲苯 | 13.98 | 13.98 | 13.98 | 13.98 | 13.98 |
| Y-7935 (pure monomer resin) | | 3 | | | |
| RE 105XL (hydrogenated rosin resin) | | | 3 | | |
| GA100 (Rosin) | | | | 3 | |
| TP2040 (Phenolic Terpene) | | | | | 3 |
| OB-1 | 0.02 | 0.02 | 0.02 | 0.02 | 0.02 |
| L, a, b before heating | 95.89, −0.56, 1.67 | 95.69, −0.47, 1.96 | 95.29, −0.44, 1.98 | 96.11, −0.24, 2.18 | 96.12, −0.21, 2.06 |
| L, a, b after heating (15 days) | 95.76, −0.48, 2.71 | 95.76, −0.23, 3.01 | 95.36, −0.21, 3.11 | 95.95, −0.11, 3.70 | 95.95, −0.2, 3.69 |
| Δb | | 1.04 | 1.05 | 1.13 | 1.52 | 1.63 |
| Δe | | 1.05 | 1.08 | 1.16 | 1.53 | 1.64 |

The results in Table 4 show that all of Examples 8-12 demonstrate good yellowing resistance performance as evaluated by Δe. The results show that after the heat treatment under 90° C., Example 9 comprising a pure monomer resin (Y-7935) and Example 10 comprising a hydrogenated rosin resin (RE 105XL) showed Δb values of 1.05 and 1.13, respectively. The Δb values are below the threshold of 1.3 and they also closely resemble that of the PSA without any tackifiers (Example 8). For example, Example 10 showed only a minor increase of 12% in Δb value relative to Example 8. This indicates that certain tackifiers, e.g., pure monomer resins or hydrogenated resins, may be utilized in the PSAs using while still providing improvements in thermal yellowing resistance (even though tackifiers are generally known to have detrimental effects on yellowing resistance).

Example 11, employs a rosin resin GA100, and Example 12, employs a phenolic terpene resin TP2010. These examples demonstrated Δe values of 1.53 and 1.64, respectively, which are both below the 2.1 threshold, thus indicating good yellowing resistance as evaluated by Δe.

Examples 11 and 12 showed Δb values of 1.52 and 1.63, respectively, which are above the threshold of 1.3. Examples 11 and 12 demonstrate that some tackifiers may provide a suitable PSA from a Δe perspective, but may still have a detrimental effect on yellowing resistance (although still suitable for many applications). This shows that rosin resin GA100 and phenolic terpene resin TP2010, while providing for a PSA with acceptable Δe performance, may have negative effect on the yellowing resistance performance of the PSA as evaluated by Δb.

The invention has been described in detail, modifications within the spirit and scope of the invention will be readily apparent to those of skill in the art. In view of the foregoing discussion, relevant knowledge in the art and references discussed above in connection with the Background and Detailed Description are all incorporated herein by reference. In addition, it should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriate combined with other embodiments as will be appreciated by one of skill in the art. Furthermore, those of ordinary skill in the art will appreciate that the foregoing description is by way of example only, and is not intended to limit the invention.

We claim:

1. A pressure sensitive adhesive comprising:
   a polyacrylate base polymer,
   a crosslinker, wherein the crosslinker does not comprise a metal acetylacetonate, a metal alkoxide, or an alkoxymetal acetylacetonate,
   a fluorescer, wherein the fluorescer comprises less than 0.1 wt. % metal oxide based on the solid weight of the adhesive, and wherein the fluorescer comprises a benzoxazole derivative or a biphenyl derivative or a combination thereof.

2. The pressure sensitive adhesive of claim 1, wherein the pressure sensitive adhesive demonstrates a peel strength of at least 1 N/inch to 20 N/inch, as measured by FINAT Test Method 1 (2018).

3. The pressure sensitive adhesive of claim 1, wherein the pressure sensitive adhesive demonstrates a yellowing resistance Δb value less than 1.3 and/or a yellowing resistance Δe less than 2.1, as measured by ASTM D2244, or when exposed to a temperature of 90° C. for 2 weeks or when exposed to ultraviolet light for at least one week.

4. The pressure sensitive adhesive of claim 1, wherein the fluorescer is present in an amount ranging from 0.01 to 0.4 wt. % based on the solid weight of the pressure sensitive adhesive.

5. The pressure sensitive adhesive of claim 1, wherein the fluorescer is present in an amount ranging from 0.02-0.3 wt. % based on the solid weight of the pressure sensitive adhesive.

6. The pressure sensitive adhesive of claim 1, wherein the crosslinker is present in an amount ranging from 0.05-0.4 wt. %, based on the solid weight of the PSA.

7. The pressure sensitive adhesive of claim 1, wherein the pressure sensitive adhesive is disposed in the form of a flat layer and wherein the flat layer has a thickness in the range of 8-80 μm.

8. The pressure sensitive adhesive of claim 1, wherein the fluorescer is a compound having at least one vinyl group.

9. The pressure sensitive adhesive of claim 1, wherein the pressure sensitive adhesive is essentially free of chlorinated polyolefin.

10. The pressure sensitive adhesive of claim 1, wherein the crosslinker comprises an isocyanate, an epoxy, or a combination thereof.

11. The pressure sensitive adhesive of claim 1, wherein the fluorescer comprises a benzoxazole derivative comprising a vinyl group, and wherein the pressure sensitive adhesive demonstrates a yellowing resistance b value less than 1.3, as measured by ASTM D2244 (2018) when exposed to ultraviolet light for at least one week.

12. The pressure sensitive adhesive of claim 1, wherein the fluorescer comprises a benzoxazole derivative and wherein the pressure sensitive adhesive demonstrates a yellowing resistance Δb value less than 1.3 and/or a yellowing resistance Δe less than 2.1 as measured by ASTM D2244, when exposed to a temperature of 90° C. for 2 weeks or when exposed to ultraviolet light for at least one week.

13. The pressure sensitive adhesive of claim 1, wherein the pressure sensitive adhesive has a peel strength of 1-20 N/inch, as measured by FINAT Test Method 1 (2018).

14. The pressure sensitive adhesive of claim 1, wherein the fluorescer comprises a benzoxazole derivative comprising a vinyl group, wherein the crosslinker comprises epoxy resin, isocyanine, or combination thereof, and wherein the polyacrylate base polymer is produced by polymerizing one or more monomers selected from the group consisting of butyl acrylate, 2-ethylhexyl acrylate, methyl acrylate and acrylic, and 2-hydroxyethyl acrylate, and wherein the pressure sensitive adhesive demonstrates a yellowing resistance Δb value less than 1.3 and/or a yellowing resistance Δe less than 2.1 as measured by ASTM D2244 (2018), and a peel strength ranging from 1 N/inch to 20 N/inch, as measured by FINAT Test Method 1 (2018).

15. The pressure sensitive adhesive of claim 1, wherein the crosslinker comprises tetra-glycidyl m-xylene diamine.

16. The pressure sensitive adhesive of claim 1, wherein the polyacrylate base polymer is synthesized by polymerization of one or more monomers of butyl acrylate, 2-ethylhexyl acrylate, methyl acrylate and acrylic, and 2-hydroxyethyl acrylate.

17. The pressure sensitive adhesive of claim 1, wherein the PSA further comprises a tackifier, wherein the tackifier is a pure monomer resin, a hydrogenated resin, or combinations thereof.

18. The pressure sensitive adhesive of claim 1, wherein the pressure sensitive adhesive, when exposed to a temperature of 90° C. for 2 weeks or when exposed to ultraviolet light for at least one week, demonstrates a Δb value less than 5.

19. A pressure sensitive adhesive solution comprises
a polyacrylate base polymer solution,
a crosslinker, wherein the crosslinker does not comprise a metal acetylacetonate, a metal alkoxide, or an alkoxy-metal acetylacetonate,
a fluorescer, wherein the fluorescer comprises less than 0.1 wt. % metal oxide and wherein the fluorescer comprises a benzoxazole derivative or a biphenyl derivative or a combination thereof, and
a solvent.

20. The pressure sensitive adhesive solution of claim 19, wherein the polyacylate base polymer solution is present in an amount ranging from 60-90% based on the total weight of the pressure sensitive adhesive solution.

21. The pressure sensitive adhesive solution of claim 19, wherein the solvent is present in an amount ranging from 10-40 wt. % based on the total weight of the pressure sensitive adhesive solution.

* * * * *